United States Patent
Lieberman

(10) Patent No.: US 6,844,948 B2
(45) Date of Patent: Jan. 18, 2005

(54) INTEGRAL HOLOGRAM REVOLVING LAMP AND METHOD FOR MAKING SAME

(75) Inventor: Larry Lieberman, 3501 SW. 26th St., Ocala, FL (US) 34474

(73) Assignees: Rabbit Tanaka Corporation Limited, Quarry Bay (HK); Larry Lieberman, Ocala, FL (US)

( * ) Notice: Subject to any disclaimer, the term of this patent is extended or adjusted under 35 U.S.C. 154(b) by 0 days.

(21) Appl. No.: 10/107,700

(22) Filed: Mar. 27, 2002

(65) Prior Publication Data
US 2003/0184831 A1 Oct. 2, 2003

(51) Int. Cl.7 .................................................. G03H 1/26
(52) U.S. Cl. .......................................................... 359/23
(58) Field of Search .............................. 359/22, 23, 25, 359/26

(56) References Cited

U.S. PATENT DOCUMENTS

| | | |
|---|---|---|
| 3,633,989 A | 1/1972 | Benton |
| 4,206,965 A | 6/1980 | McGrew |
| 4,339,168 A | 7/1982 | Haines |
| 4,390,234 A | 6/1983 | Embach |
| 4,420,829 A | 12/1983 | Carlson |
| 4,550,395 A | 10/1985 | Carlson |
| 4,807,971 A | 2/1989 | Nurano |
| 4,832,424 A | 5/1989 | McGrew |
| 5,111,313 A | 5/1992 | Shires |
| 5,497,252 A | 3/1996 | Ben-David |
| 5,570,208 A | 10/1996 | Kato et al. |
| 5,754,147 A | 5/1998 | Tsao et al. |
| 5,846,452 A | 12/1998 | Gibbons et al. |
| 6,018,403 A * | 1/2000 | Shirakura et al. ............. 359/23 |
| 6,101,161 A | 8/2000 | Yang |
| 6,195,184 B1 | 2/2001 | Chao et al. |
| 6,251,566 B1 | 6/2001 | Brosh et al. |
| 6,274,294 B1 | 8/2001 | Hines |
| 6,285,472 B1 | 9/2001 | Odhner et al. |
| 6,460,278 B1 * | 10/2002 | Jurjavcic ...................... 40/473 |
| 6,631,016 B1 * | 10/2003 | Klug et al. ................... 359/23 |

FOREIGN PATENT DOCUMENTS

| | | | |
|---|---|---|---|
| CA | 2277653 | 1/2001 | ............ G03H/1/24 |
| EP | 0 436 349 A1 | 7/1991 | ............. F21P/1/02 |
| JP | 57006878 | 1/1982 | ............ G03H/1/24 |

OTHER PUBLICATIONS

Mehta, P.C., and V.V. Rampal, "Lasers and Hologrpahy," World Scientific, Singapore, 1993, pp. 398–403.

* cited by examiner

Primary Examiner—Mark A. Robinson
Assistant Examiner—Alessandro Amari
(74) Attorney, Agent, or Firm—Chapman and Cutler LLP

(57) ABSTRACT

An illuminated colored display device provides a 360-degree viewable hologram, having the properties of a distortion free, monochromatic or full-color reconstruction from a single white light source, an extended vertical viewing aperture, and extended moving scene. These advantageous properties are provided by a rotating display device and a type of "synthetic" hologram composed of movie film frames or digital information. Each color component hologram consists of an array of noncontiguous small dots or thin stripes so that the three-color component holograms may be intermeshed without overlap of the dots or stripes. The component holograms themselves are vertically focused so that the composite hologram is white light viewable. The disclosed method includes the provision of a novel optical film holder and transport system.

27 Claims, 4 Drawing Sheets

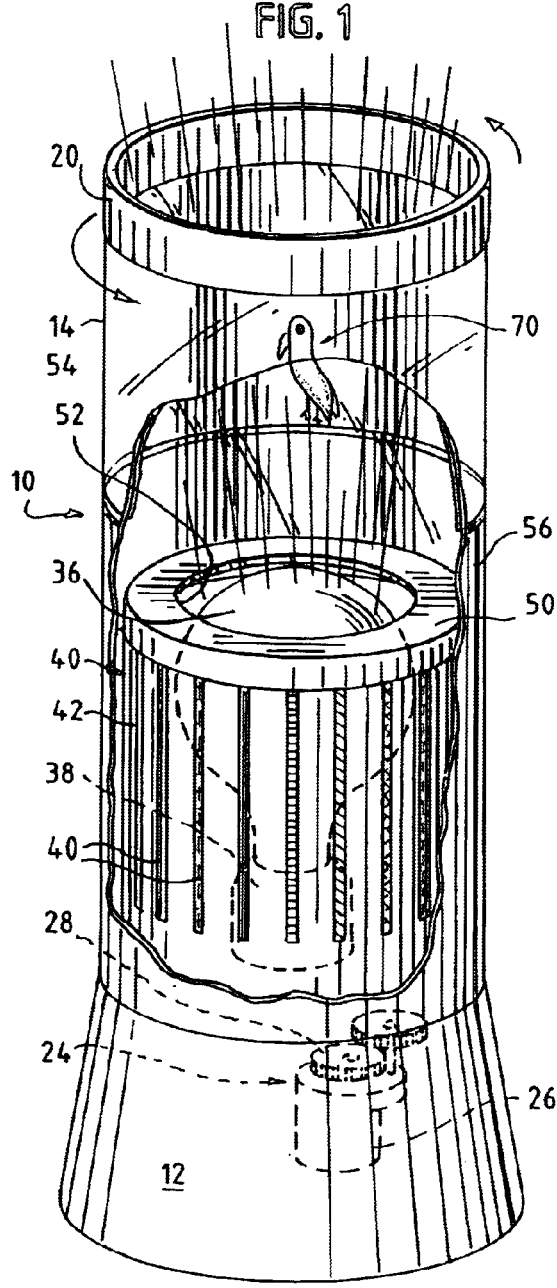
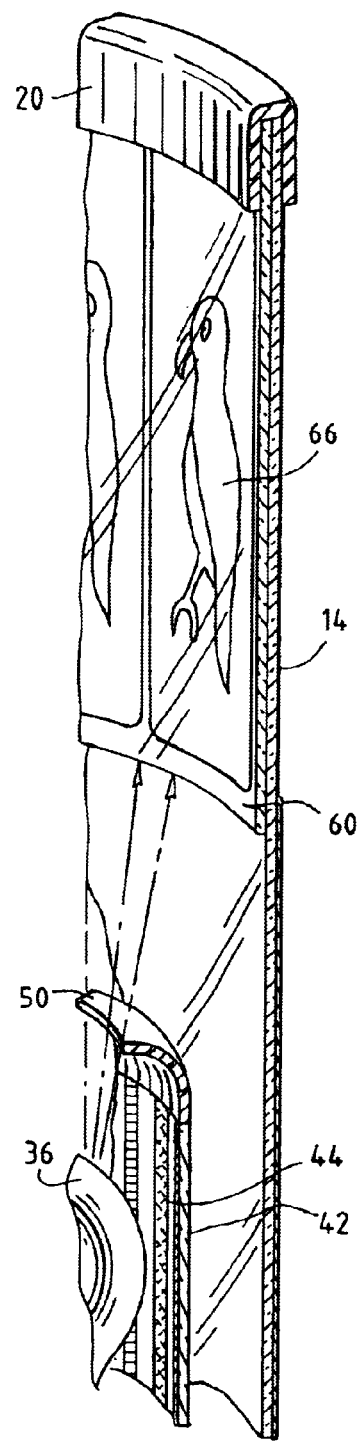

FIG. 3
FIG. 4
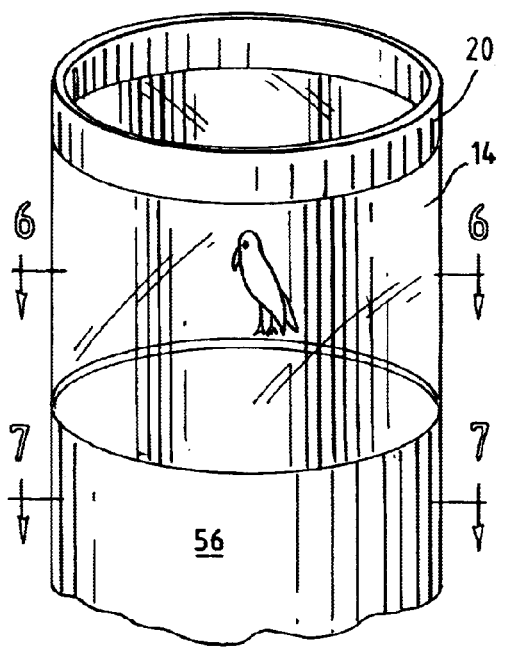
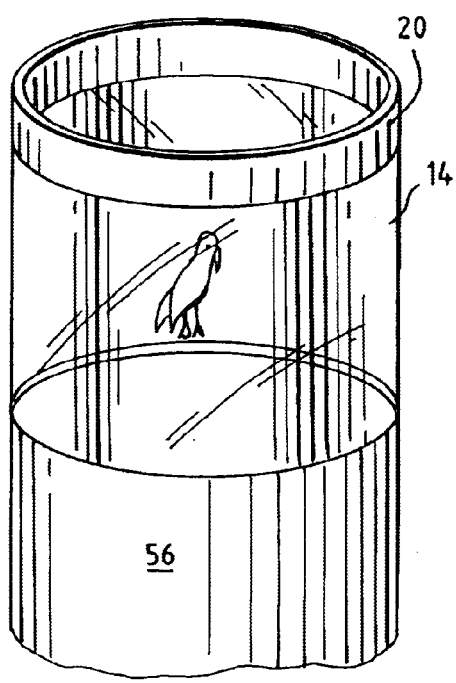
FIG. 5
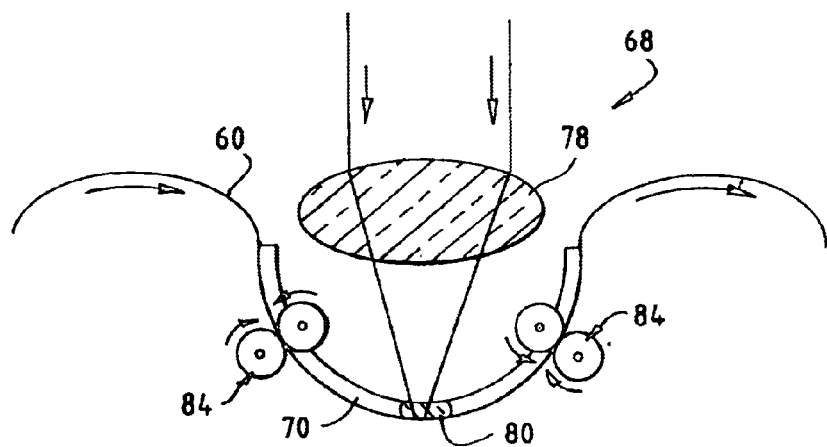

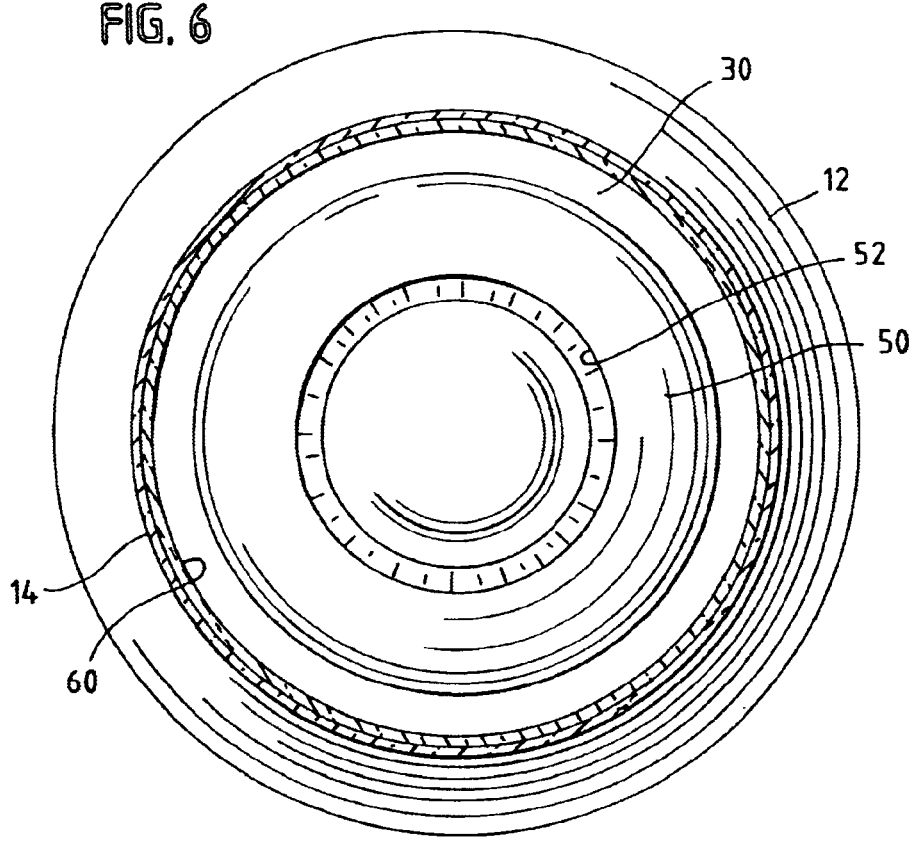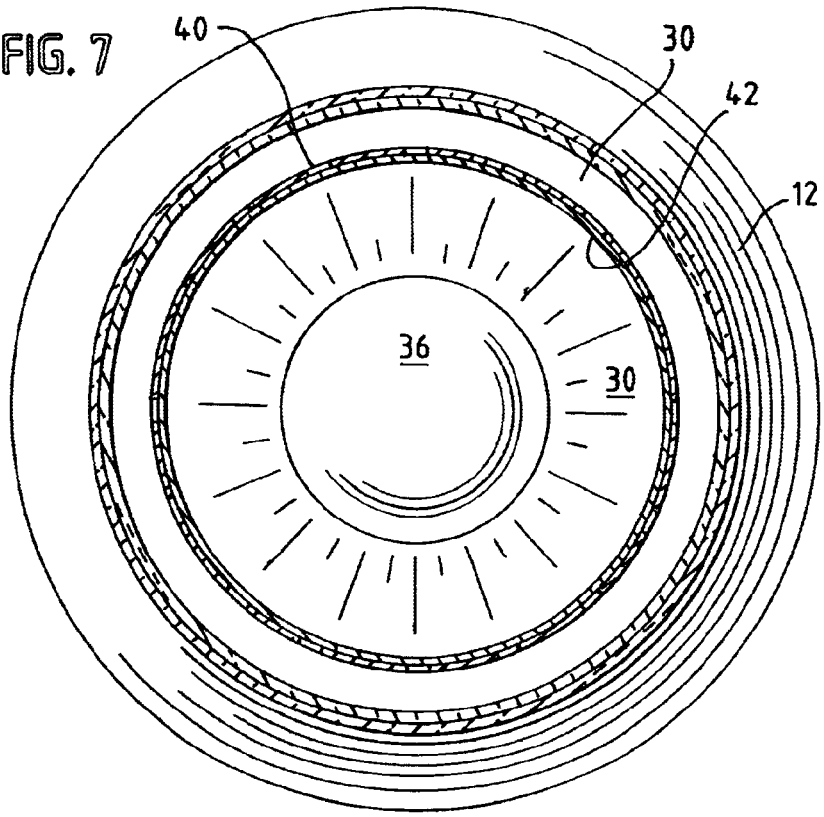

INTEGRAL HOLOGRAM REVOLVING LAMP AND METHOD FOR MAKING SAME

BACKGROUND OF THE INVENTION

1. Field of the Invention

This invention relates to illuminated display, and more particularly to a display device, which presents 360-degree viewable, 3-dimensional hologram, an optical film holder and transport system for recording the images and a method for making the same.

2. Description of Related Art Including Information Disclosed under Secs. 1.97–1.99

Various types of ornamental illuminated display devices have been provided in the past. Some of these devices have obtained a desired visual effect of changing light patterns by passing light through rotating elements contained within transparent housings located between the viewer and the source of light. Two or more liquids of different colors have been utilized, with air bubbles being passed through the liquids to provide changing colors and patterns. Typical of such devices are those shown in U.S. Pat. No. 3,613,264—Vitka et al, U.S. Pat. No. 3,706,149—Olivieri, and U.S. Pat. No. 3,964,194—Gugeler. For instance, the Gugeler patent describes a changeable color device wherein an illumination source is located within three concentric cylinders formed of a light transmissive material, between pairs of which air is bubbled through a liquid.

Other ornamental illuminated display devices have obtained the desired visual effect of changing light patterns by causing the movement of one or more light transmissive means of varying shapes and colors with respect to the light source. Typical of such devices are those shown in the following U.S. patents: U.S. Pat. No. 2,867,716—Ream U.S. Pat. No. 3,791,058—Mollica U.S. Pat. No. 3,179,791—Mole U.S. Pat. No. 5,065,289—Teng U.S. Pat. No. 3,686,494—Naylor U.S. Pat. No. 5,394,309—Brown The Ream patent discloses an ornamental display device wherein a bulb is located in a rotating drum which is provided with perforations through which light projects to a clear plastic cylindrical shell. The Mole patent describes an illuminating device wherein three lenses of different colors are mounted in a triangular form on a support, which rotates about a light source. The light passing through the lens also passed through an aperture formed in the spherical housing containing the light source and lens.

The Naylor patent illustrates a lighting apparatus wherein two concentric cylindrical light transmissive members having designs thereon are caused to counter-rotate around a light source. The heat generated by the light source causes air currents to engage blades secured to the cylinders to cause them to rotate. The Mollica patent sets forth a device for providing visual effects including a source of black light located within a rotatable hollow cylindrical translucent element having a pattern thereon subject to fluorescence. The translucent element is surrounded by a cylindrical lens, which is located within a translucent rectangular housing.

U.S. Pat. No. 4,832,424 to McGrew describes cylindrical holograms that are viewable in monochromatic light such as those created by Dr. Tung Jeong. Dr. Jeong describes a single-step process wherein an object is placed inside a cylinder of holographic film and both object and film are illuminated simultaneously by a laser beam diverging from a point on the axis of the cylinder. Light scattering from the object interferes with the light directly illuminating the film and produces an interference pattern on the film. The exposed film is developed to yield a hologram of the object, viewable by rolling the film into a cylinder and illuminating it with monochromatic light from a point on the axis corresponding to the point from which the reference beam diverged. A significant disadvantage of Dr. Jeong's process, which is overcome by the present invention, is that the hologram requires an expensive monochromatic illuminating source, such as filtered mercury are lamp or a laser.

Another prior art cylindrical hologram is the "Cross" hologram, such as is described in U.S. Pat. No. 4,206,956. The Cross hologram is synthesized from a large number of two-dimensional images and is analogous to a lenticular photograph. While the Cross hologram is viewable in white light, it must be manufactured by a complex process requiring expensive precision equipment, and it requires production of a motion picture film under special conditions.

Also in the prior art is a hologram covered by U.S. Pat. No. 3,633,989 to Dr. Steven Benton. Dr. Benton's patent primarily covers a means of producing an information-limited hologram of a subject for the purpose of making a white-light viewable image. The method produces white-light viewable holograms, but will not work for making cylindrical holograms, without cumbersome optical systems for forming and reconstructing holograms in a cylindrical symmetrical arrangement. The method calls for forming a real image of the subject of the hologram and limiting the vertical parallax of the light forming the real image.

Several workers in the field have attempted to copy cylindrical holograms by flattening an original cylindrical hologram, then reconstructing to form a second hologram on a plane parallel to the plane of the flattened original, but at a distance away. An example of such attempts is described in U.S. Pat. No. 4,339,168. One purpose of the attempts was to create a second hologram which formed a cylinder of smaller diameter, but which contained an image of the original size; another purpose was to create a second hologram whose image intersected the plane of the film.

These attempts worked poorly because flattening the cylinder rearranges the wavefront in such a way that the image is severely distorted and has no well-defined location. Haines' two-step method is inherently incapable of compensating for the distortions caused by changing the shapes of the holograms.

Prior to the present invention, there was no known low cost method for creating a white-light viewable hologram such as the multiplexed holograms of cylindrical "Cross" type, described in U.S. Pat. No. 4,206,956 by Stephen P. McGrew. Prior art relating to spatial filtration of wavefronts was described by Dr. Steve Benton as a method for producing white-light viewable holograms wherein a first hologram is constructed at a certain location (the "viewing location"); then a second hologram is formed at the real image position from the real image reconstructed when a long horizontal strip of the first hologram is illuminated by the conjugate to its reference beam.

In Benton's method, restricting the reconstructed portion of the first hologram to a horizontal strip is a form of spatial filtering. Once the first hologram has been made, there is no choice of viewing location. The cylindrical Cross hologram and T. Jeong's cylindrical laser-viewable hologram are prior art cylindrical holograms. The Cross hologram is made in a series of steps including production of a cinema film. Jeong's hologram is made in a single step and is not white-light viewable.

U.S. Pat. No. 5,570,208 discloses a stereoscopic display method, a forming method, and a stereoscopic display apparatus of a hologram for performing a stereoscopic display by forming a hologram of a virtual object or an object which actually exists and, more particularly, to a stereoscopic display method, a forming method, and a stereoscopic display apparatus of a hologram for performing a natural stereoscopic display by using a 2-dimensional image.

A stereoscopic display is a display for enabling a depth or a thickness of a 3-dimensional object to be easily visually understood. Such a stereoscopic display is strongly demanded in a display of a structural object designed by a CAD or the like, a display of a medical image, or the like. On the other hand, a solid image is more impressive as compared with a 2-dimensional display and is also used in a display for amusement in an amusement park, a movie, or the like.

With respect to the stereoscopic displays, in general, various kinds of methods have already been proposed. There is a hologram as means in which an observer can see a solid image without using special glasses. The hologram is a special image in which an object image was recorded by using an interference operation of the light. With regard to a still object, a color hologram having a depth feeling has already been produced. On the other hand, as a method whereby a virtual object having a 3-dimensional structure formed by the CAD or the like is stereoscopically seen, there is a computer graphics (CG). The computer graphics is a technique in which a 2-dimensional image, when an object is seen from a predetermined direction, is calculated and is really expressed in consideration of the reflection or shadow of the light. Since the computer graphics, however, intends to obtain a 2-dimensional image, a stereoscopic feeling is insufficient. It is possible to display, with a stereoscopic feeling, by a holographic stereogram system such that 2-dimensional images, when an object is seen from various directions, are sequentially recorded into stripe-like regions, each having a microwidth in the horizontal direction and a width of screen in the vertical direction, by the holographic exposure on the basis of the 2-dimensional image by the computer graphics.

According to the conventional holographic stereogram, however, a 2-dimensional image is fundamentally seen and the surface at which a focal point of the eyes is located doesn't coincide with the position of the image which is observed by a parallax of both eyes. Therefore, it is hard to see and such a state results in a cause of a fatigue. Particularly, in a case of displaying an image of a deep depth, a burden on the eye increases and such a stereoscopic display is undesirable. The conventional hologram is recorded onto a film-like medium and it takes time to develop the image, so that it is inconvenient as a stereoscopic display system. Further, the display contents cannot be rewritten.

SUMMARY OF THE INVENTION

It is an object of this invention to provide an illuminated rotating lamp device, which presents a visual, 3-dimensional hologram to an observer.

It is a further object of this invention to provide an illuminated rotating lamp device, which presents a white light viewable integral hologram.

It is a still further object of this invention to provide such an illuminated rotating lamp device which small, low cost and produces a high quality, undistorted integral hologram.

It is a still further object of this invention to provide such an illuminated rotating lamp device, which is readily assembled from limited number of components, which can be economically manufactured.

It is a still further object of this invention to provide an optical film holder for use in making such an illuminated rotating lamp device.

It is a still further object of this invention to provide a method for making such an illuminated rotating lamp device, which produces a high quality, undistorted integral hologram.

It is a still further object of this invention to provide such a portable, illuminated rotating lamp device which is readily assembled from components which can be manufactured at low cost to produce a pleasing, high quality, undistorted integral Hologram.

It is a still further object of this invention to provide a system capable of synthesizing relatively large strip-multiplexed holograms and capable of synthesizing strip-multiplexed holograms over a wide range of sizes.

It is a still further object of this invention to provide a system for synthesizing strip-multiplexed holograms without the use of large and expensive lens systems.

It is a still further object of this invention to provide a system for synthesizing strip-multiplexed holograms which is easily adapted to various image generating techniques, which is capable of synthesizing both transmission and reflection holograms, which is capable of synthesizing flat holograms viewable with a white light source without distortion, and which is capable of synthesizing multicolor holograms.

Another object of this invention is to provide a system for creating holograms, which allows a great deal of flexibility in orienting the reference beam with respect to the object beam.

It is still another object of the invention to provide a system for creating undistorted integral holograms with a low cost, optical film holder and transport system.

It is a further object of this invention to provide an optical device, which simultaneously shapes an anamorphic image bearing wavefront into a substantially cylindrical wavefront, and superimposes a reference beam onto the cylindrical wavefront.

In accordance with this invention an illuminated revolving lamp device includes a base, and at least one translucent member which is supported on a turntable which is in turn supported by the base and are rotated with respect to the base by a drive system included in the base. The translucent member, which in the preferred embodiment is of a cylindrical or frustum shape, surrounds a source of illumination, which is also supported, on the base. The translucent member, or a second translucent member coaxial with the first, carries the holographic information. An opaque cover is supported over the top end of all of the translucent members. The translucent members may be removed from the base to gain access to the source of illumination, which in the preferred embodiment is an electric light bulb.

The above and other objects, features, and advantages of the present invention will become more apparent from the following detailed description of the invention with reference to the drawings.

BRIEF DESCRIPTION OF SEVERAL DRAWINGS SHOWING ALTERNATIVE CONSTRUCTIONS OF THE BASE AND OTHER MEMBERS

FIG. 1 is a perspective view of an integral hologram revolving lamp made in accordance with the present invention;

FIG. 2 is an enlarged, partial, sectional view taken generally along the line 2—2 of FIG. 1;

FIG. 3 is a partial perspective view of the top portion of the device showing the hologram in one position;

FIG. 4 is another partial perspective view of the hologram device showing the hologram in another position;

FIG. 5 is a vertical, sectional view of the optical film holder and transport system of the present invention;

FIG. 6 is a vertical section taken generally along the line 6—6 of FIG. 3;

FIG. 7 is a vertical section taken generally along the line 7—7 of FIG. 3;

DETAILED DESCRIPTION OF THE PREFERRED EMBODIMENT

Figure 8:
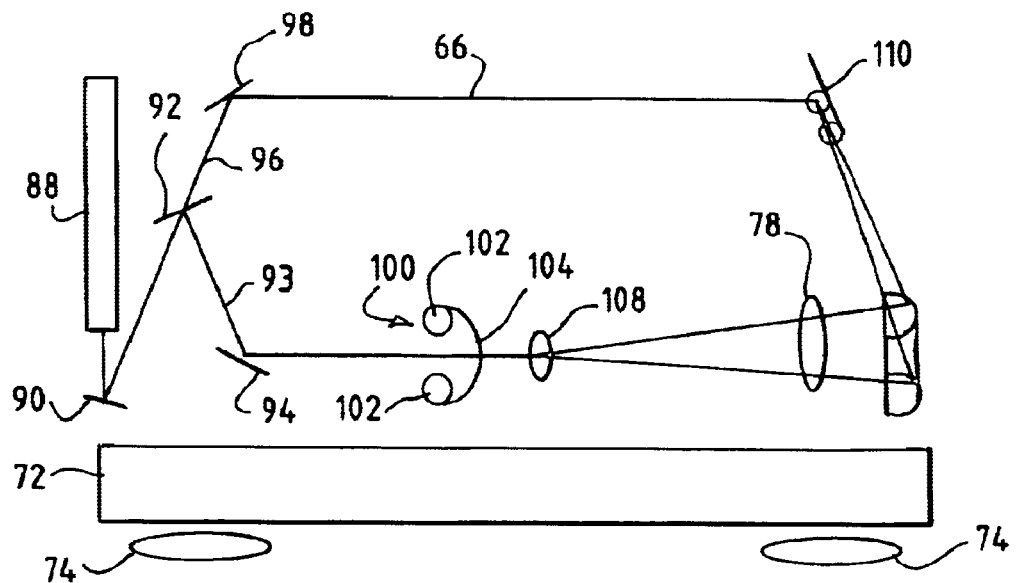
FIG. 8 is a diagrammatic representation of the printer system made in accordance with the present invention.

The present invention and method are described hereinafter with reference to the above-described figures.

Strip-multiplexed holograms are formed by a plurality of narrow, holographic images recorded on holographic recording medium in a plurality of laterally displaced, adjacent strips. Many of the techniques for making strip-multiplexed holograms have been developed by the Multiplex Company of San Francisco. In their system, an ordinary black and white motion picture film is made of a slowly rotating subject such that the film frames contain views of the subject taken from all angles around the subject. The cinema film is projected by a projector having a laser light source through a large spherical lens and a large cylindrical lens placed directly beyond the spherical lens. The large lenses bring the image to a line focus near the surface of a sheet of holographic recording medium mounted in a film transport. A fan-shaped reference beam, originating at a point directly above the cylindrical lens, is projected onto the holographic recording medium so that the reference beam is superimposed upon the line focus of the image or object beam.

The interference pattern formed by the superimposition of the image modulated object beam and the reference beam near the line focus of the image is recorded on the sheet of holographic recording medium mounted on an incrementally driven movable platen. Each frame of the motion picture film is thus recorded as a vertical strip hologram, and the full sequence of frames is recorded as a series of adjacent, laterally spaced strip holograms on the holographic recording medium. The resulting composite hologram is viewed by bending it into a cylindrical shape and placing a point source white light such as a small, bright, incandescent bulb, on the axis of the cylinder in a position corresponding to the position of the reference beam source relative to the holographic recording medium when the hologram was recorded. The resulting composite image is an accurate three-dimensional reconstruction of the subject without vertical parallax and in rainbow colors.

Geometrically, the hologram formed by this prior art method is approximately equivalent to the white light viewable "rainbow hologram" developed around 1969 by Steve Benton of Polaroid Corporation wherein white-light viewability is obtained by restricting monochromatic viewability to a thin horizontal line as illustrated in U.S. Pat. No. 3,633,989. Further techniques for forming composite holograms, which are not viewable in white light, are described in "Optical Holography" by Collier, Burckhardt and Lin, Academic Press 1971.

A further development of the above-described system allows synthesizing strip-multiplexed holograms without the use of a reference beam. According to this method, a holographic diffraction grating is synthesized by projecting an unmodulated object beam and the reference beam onto the holographic recording medium. The diffraction grating thereby produced is then placed in contact with the holographic recording medium, the reference beam is removed, and the sequence of images (the object beam) is projected as before, each image serving to spatially amplitude-modulate the blank frame holographic diffraction grating which is thus contact printed onto the holographic recording medium in a series of laterally displaced vertical strips. The result is a synthesized holographic three-dimensional image having a quality comparable to images previously made on holographic recording medium using a reference beam.

While these developments represent a significant advance in the state of the art, the system nevertheless exhibits several disadvantages and problems. The large spherical and cylindrical lenses in the system are only suitable for producing one size of synthesized hologram without introducing distortions. To scale up the system to relatively large holograms, for example, larger than 50 centimeters, very large spherical and cylindrical lenses are required which are prohibitively expensive, cumbersome and hence impractical. Furthermore, the lens geometry required by the necessity that the reference beam originate along the axis of the object beam cylindrical lens prohibits certain configurations of the reference beam and certain positions of the reference beam relative to the image. The input systems for strip-multiplexed holography have generally been limited to cinema film projectors.

Therefore, prior art strip-multiplexed hologram systems are not suitable for applications where a short recording time is required for mass production. Other problems associated with prior strip-multiplexed hologram synthesizers is that they have no provision for provision for producing holograms viewable without distortion in a flat display mode using a point illumination source. The prior systems do not process the object beam to produce higher quality images such as may be produced by using spatial filtering at the Fourier plane for image enhancement or reduction of the effects of grain in the image, or by using electronic image enhancement in connection with a video projector.

Prior to this invention, it has not been possible to mass-produce a small, low cost, high quality undistorted 360-degree integral holographic stereogram or white light viewable integral hologram. An integral hologram as described above with respect to certain prior art devices, is a type of synthetic hologram made up by movie frames or digital information. The subject of the hologram is usually a 3-dimensional object which is recorded on movie film, digital video or computer graphics while it is rotated on a turntable. Once the subject is recorded on the "master" film, the film is developed and additional copies are prepared utilizing a laser optical printer system. The laser optical printer system enables each frame of the movie film to be projected onto the holographic film and recorded, frame by frame, side by side (integrated) into the white light viewable integral hologram. The present invention provides a revolving integral hologram in a lamp or display requiring a unique combination of inventive optical/mechanical tooling configurations. The invention also includes an optical film holder and transport mechanism to support and move the holographic film as it is recorded. As described below, with respect to the figures, the holographic film holder is curved away from the image projection and a cylindrical lens on the curved film support eliminates optical distortions while further condensing and focusing the image. The cylindrical lens improves the image clarity and brightness while acting as a stable film support and smooth surface to allow the holograph film to be mechanically moved by the pinch rollers as described below.

The holographic recording is done by interference of the object beam and reference beam. The object beam includes the image of the subject and the reference beam forms the light into a line focus to cover the object image from the cylindrical lens. The two beams interfere at the film plane and record the image inside the depth of the photographic emulsion. The recording must be done on a very stable, optical table that is interferometricly stable since any movement of more than a quarter of wavelength will cause the image not to be recorded. This creates the master hologram, which can be reproduced by contact copying to a new holographic film by conventional laser scanning.

The success of the white light moving hologram is a combination of space and time meeting at the critical match up. The 360 degree hologram is a perfect 3-dimensional motion picture of the image and the preferred embodiment of the 360 degree white light hologram. The eye sees 260 frames in an eight-second timeframe to yield 30 frames per second as a continuous, non-jittering display. At this critical rate, the subject appears to be displayed as a floating, 3-dimensional moving image.

The integral hologram revolving lamp device of the present invention is shown in FIG. 1 and generally designated by the numeral 10. The principal components of the device include a base 12 and upstanding cylindrical member 14 and a top ring or cap 20. A selectively operable drive system 24 is provided in the base 12, and includes a motor 26 and gear train 28. A rotatable platen or turntable 30 is mounted on the base for rotation generally about the vertical axis of the cylindrical member 14 and it is in driving engagement with the gear train 28 whereby the drive system 24 rotates the platen 30 and the cylindrical member 14 mounted thereon. The turntable 30 can be mounted in any conventional manner, and attached to the drive system as described which is in turn electrically energized to rotate the cylindrical member 14 when the drive system 24 is turned on. Preferably, the motor 26 is a constant speed motor causing the cylindrical member 14 to rotate at a constant rate; however, a variable speed motor could be employed so that the rate of rotation of the cylindrical member 14 may be adjusted.

Referring again to FIG. 1, a source of illumination 36 is mounted on the base 12 generally along the vertical axis of the cylindrical member 14. In the preferred embodiment, the light source 36 is a conventional light bulb mounted in a stationary socket 38 that is electrically connected to the power source so that when the drive means 26 is energized, the light source 36 is also energized. Again, the light source 36 is conventional in nature and includes a typical filament enclosed within a clear glass structure to provide diffused light. A light director or light shield generally designated 40 is mounted on the turntable 30 about the light source 36. The light shield includes a cylindrical wall portion 42, which is generally opaque, and may be completely opaque to prevent any light from the illumination source 36 passing therethrough. In the embodiment shown in FIG. 1, the cylindrical wall 42 of the light shield includes a plurality of transmissive, in this case, vertical stripes 44 which may be colored or bear selected indicia to provide a pleasing, rotating display. Alternatively, the indicia 40 may be configured to display an advertising slogan or message. The light shield 40 further includes at its upper end, a ring or cap 50 made of opaque material such as plastic. The cap 50 extends inwardly and includes a circular internal aperture 52 through which the upper portion of the illumination source 36 may extend. In this fashion, the opening 52 directs lightwaves from the illumination source generally upwardly and in a radial direction away from the glowing element as indicated by the scattering lines 54 in FIG. 1 to illuminate and produce an integral hologram as will be described in greater detail hereinafter.

In addition to the light director shield 40, a further opaque cylindrical wall 56 is mounted on the cylindrical member 14, or may be formed integrally therewith, and preferably extends above the upper cap 50 of the light director as shown in FIG. 1. Again, the cylindrical wall 56 may be configured with various transparent portions that can be colored or shaped to provide specific designs or advertising slogans alone, or in combination with the indicia 40 on the light director. In the embodiment shown, the light director 40 and the cylindrical element 14 bearing the opaque portion 56 rotate in the same direction and at the same speed as the platform 30 upon they are mounted. However, it is contemplated that modifications to this mechanical structure could be made so that, for example, the light director 40 and the cylindrical member 14 rotate in opposite directions creating cooperation and variations in the light that may emanate through the indicia 40 and similar indicia on the sleeve 56.

In the preferred embodiment, a generally transparent, holographic recording medium or film generally designated 60 (FIG. 2) is mounted conjointly with the upper transparent end of the cylindrical member 14 as show in FIG. 2. The recording medium 60 and the outer cylindrical element 14 provide a two-layer or two-ply upper end to the cylindrical member 14 which may be engaged by the ring cap 20 and held in position near the upper end of the cylindrical member 14. Alternatively, it is also possible to merely utilize the holographic recording medium 60 as an extension of the cylindrical member 14 so that only one layer exists at the upper end of the cylindrical member depending upon manufacturing design and choice.

Figure 9:
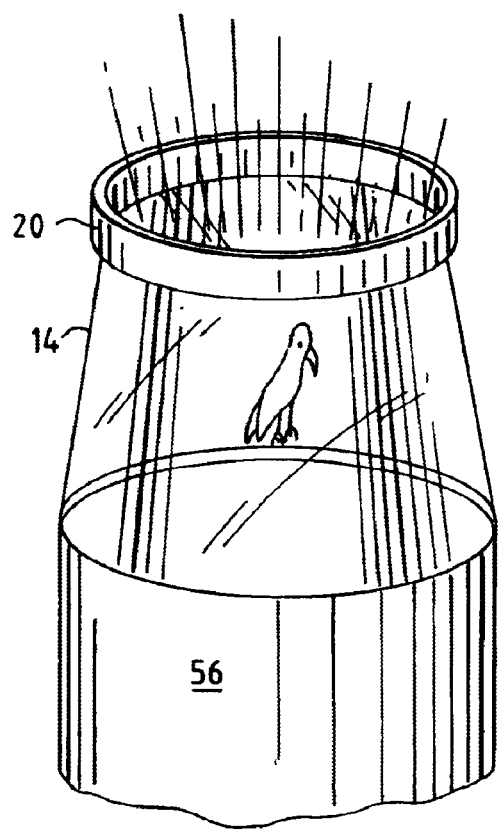
FIG. 9 is a partial perspective view of the device showing its upper translucent portion in a frustum shape.

In the preferred embodiment of the present invention, the holographic medium 60 bears hologram image information, such as the parrot FIG. 66 shown in FIG. 2. The image 66 appears in this drawing to be a cutaway of the displayed holographic image in order to show more detail but would be the recorded image on the hologram. The holographic image information extends through the entire 360 degrees of the holographic recording medium 60 at the upper end of the cylindrical member 14. The holographic image information is recorded on the medium 60 as will be described in greater detail with respect to FIGS. 5 and 6. However, the holographic image information 66, when the light source 36 is illuminated, creates a 360 degree viewable, 3-dimensional hologram, generally designated 70, to appear within the cylindrical member 14, above the light source 36. The 360 degree white light viewable hologram 70 appears to rotate with the cylindrical member 14 and the holographic recording media 60 as the cylindrical member 14 is caused to rotate by the drive means 24. Therefore, at one point in time the image will appear to be facing, for example, to the left as shown in FIG. 3 and after 180 degrees of rotation of the cylindrical member 14, it will appear to be facing the right as shown in FIG. 4. As shown in the figures, the upper transparent portion of the cylindrical member 14 permits clear, unobstructed viewing of the 3-dimensional internal holographic stereogram 70 which appears to rotate so that it is viewable to the observer through the entire 360 degrees of rotation. FIG. 9 depicts the upper translucent portion in a frustum shape.

The holographic image information is recorded on the holographic recording medium or holographic film 60 using a new method and a specially designed laser optical printer generally designated number 67 and shown in FIG. 8. The holographic recording film is moved through the printer 67 by the film holder and transport system 68 shown in FIG. 5. In particular, the film holder and transport mechanism includes a semi-circular, arcuate guide 70 that is supported on a generally horizontal, isolated optical table 72 in a substantially vertical orientation. In a conventional manner, the optical table is supported by mounts 74, such as inner tubes, so that the entire system remains free from vibration. The arcuate guide 70 is mounted generally adjacent a first cylindrical lens 78 which receives and condenses the laser projected image as shown, onto a second cylindrical lens 80 mounted within the arcuate guide 70 so as to be in contact with the recording medium 60 for recording of the holographic images thereon. The image is projected by the laser through the cylindrical lens 78 and through the contact cylindrical lens 80 of the film transport mechanism onto the holographic film 60.

At least four pairs of pinch rollers 84 drivingly engage the recording film 60 for timed movement and recording. The holographic film is transported in a stepwise fashion by the pinch roller drive mechanism to intermittent positions where it is stabilized and then exposed to the holographic image that is being projected. This is repeated until all of the images are recorded side by side onto the holographic film. The holographic recording film is then processed in the appropriate chemicals such as those used in black and white photography.

Each image of the holographic recording is done by interference of the object beam and the reference beam. Conventionally, the object beam is the image with the cine image and the reference beam is from the slit optics 110. The slit optics 110 is a lens that forms the light into a line focus to cover the object image that is also a line focus from the cylindrical lens.

These two beams interfere at the film plane and record the image on the photographic emulsion. As described, this recording must be done on the optical table 72 that is interferometricly stable since any movement, within the range of one quarter of a wavelength, will prevent the image from being properly recorded. The holographic image thus created is known as the master hologram, which can be replicated by contact copying onto new holographic film in a conventional manner such as a laser scanner. This optical configuration has yielded very high quality, undistorted 360-degree viewable holographic stereograms.

More particularly, referring to FIG. 8, the laser optical printer is a 360 degree, one-step, white light viewable hologram printer system that is similar in some respects to a movie film printer except for the fact that it is used to print stereo holograms. The printer 67 includes a conventional laser 88 as its light source, which is directed by a first mirror 90 to a beam splitter 92. One portion 93 of the "split" beam is directed to an alignment mirror 94 while the other portion 96 passes through the beam splitter 92 to a second mirror 98. The first beam portion 93 is directed by the mirror 94 to a cine or LCD image generator, generally designated 100, which typically includes a pair of film rollers 102 which move a film portion 104 bearing the image through the first beam into a first projection lens 108. The projection lens 108 projects the image onto the first cylindrical lens 78 from which it is directed to the second, contact cylindrical lens 80 described with respect to FIG. 5. By reversing the curved holographic film holder and mounting the second cylindrical lens 80 directly on the arcuate film support 70, optical distortions are eliminated while further condensing and focusing the image. The holographic recording film rides directly on the second cylindrical lens 80 which optically condenses the image assisting in the critical focusing thereof. The lens 80 improves the image clarity and brightness while acting as a stable film support and a smooth surface to allow the holographic recording film to translate between adjacent exposure positions. The use of this film holder transport and recording system 68 makes possible for the first time the creation of very high quality, 360 degree 3-dimensional white light viewable integral hologram stereograms. It is now possible to produce high quality, five to ten inch diameter 360-degree holographic stereograms.

Referring again to FIG. 8, the portion of the beam 96 which passes through the beam splitter 92, is reflected by a first mirror 98 to a conventional slit optic system for creating the reference beam. The slit optic system includes lenses that forms the referenced light into a line focus as shown to cover the object image from the projection lens, which is, also formed into a line focus by the cylindrical lenses 78 and 80. As described, these two beams interfere at the film plane and record the image on the photographic emulsion to create the master hologram. Holographic images are repeatedly recorded as the recording film 60 as moved from one position to the next until the entire required recording medium has been recorded with the necessary holographic information. This white light image is a hologram of the laser master hologram. The printer 67 is controlled by a digital sequencer (not shown) that controls the various processes at the correct intervals as is known in the art. The sequence is to first shutter the laser with the laser shutter for a timed exposure. Next, the holographic film is moved to the next recording position and a cine or computer image is positioned in the cine projection and the holographic film is exposed. This process continues until the printing of all frames is completed and then the holographic film is chemically processed in the conventional manner and viewed on a 360 degree rotating display, such as that described with respect to FIGS. 1–4. The white light from a light source such as 36 replays the moving 360-degree holographic image that then appears to be floating in the center of the cylinder.

A significant advantage is that the contact cylindrical lens 80 acts to optically converge the image onto the holographic film causing the image to pre-distort, improving the final image. If the image is not pre-distorted, the final image will be distorted when viewed. The cylindrical lens being mounted directly on the film transport mechanism in contact with the recording film makes it possible to move the holographic film as it is curved away from the optical system to drastically improve the image quality.

It should be apparent to those skilled in the art that while what has been described are considered at present to be the preferred embodiments of the illuminated colored display device of this invention, in accordance with the patent statutes, changes may be made in the illuminated colored display device without actually departing from the true spirit and scope of this invention.

The appended claims are intended to cover all such changes and modifications which fall within the true spirit and scope of this invention.

What is claimed is:

1. An integral hologram display device comprising:
   a base;
   an illumination source supported on said base;

a cylindrical member supported for movement on said base about said source of illumination, said cylindrical member having an upper translucent portion having holographic image information thereon, and a generally opaque lower portion having translucent portions allowing light from said illumination source to emanate through said translucent portions to form designs visible outside said device; and a drive system supported on said base, said drive system moving said cylindrical member with respect to said base whereby the illumination from said source of illumination creates a 360-degree viewable, integral holographic stereogram and creates the designs visible outside said device.

2. The integral hologram display device of claim 1, wherein a top half of said cylindrical member includes the holographic information and a bottom half of said cylindrical member is opaque.

3. The integral hologram lamp display device of claim 1, wherein said translucent portion is of a frustum shape.

4. The integral hologram display device of claim 1, wherein a first end of said cylindrical member is supported on said base, and a cover is secured to a second end of said cylindrical member.

5. The integral hologram display device of claim 1 including a second cylindrical member of holographic recording film bearing the holographic image information secured to the first cylindrical member.

6. The integral hologram display of claim 5, wherein said first and second cylindrical members are of a frustum shape, with said second cylindrical member being of a larger diameter than the first cylindrical member.

7. The integral hologram display device of claim 1, wherein said source of illumination is electrically energized.

8. An integral hologram display device comprising:
a base;
an illumination source supported on said base;
a translucent member supported for movement on said base about said source of illumination, a first portion of said translucent member having holographic information thereon, and a second portion of said translucent member having a partially opaque wall portion;
a light director about the source of illumination; and
a drive system supported on said base, said drive system moving said translucent member with respect to said base whereby the illumination from said source of illumination creates a 360-degree viewable, 3 dimensional integral holographic stereogram inside said first portion of said translucent member, and creates the designs visible outside said device by allowing light from said illumination source to emanate through said partially opaque portion to form designs visible outside said device.

9. The integral hologram display device of claim 8, wherein said light director is shaped to direct light emanating the source of illumination onto the holographic image information on the translucent member.

10. The integral hologram display device of claim 9, wherein the source of illumination provides white light, and said light director includes an aperture to direct white light emanating from the source of illumination onto the holographic information carried by the translucent member to form a 360-degree viewable, 3 dimensional integral holographic stereogram.

11. The integral hologram display device of claim 8, wherein said drive system causes said lighting director to move in a first direction relative to the base.

12. The integral hologram display device of claim 8, wherein said light director comprises a generally opaque wall portion including a plurality of translucent sections allowing light from said illumination source to emanate through said translucent sections of the wall portion of the light director.

13. The integral hologram display device of claim 12, wherein said drive system causes one or more of said lighting director and said translucent member to move relative to one another.

14. The integral hologram display device of claim 12, wherein light that emanates through said translucent sections of the wall portion of the light director also emanates through said partially opaque wall portions of said translucent member.

15. The integral hologram display device of claim 14, wherein light that emanates through said translucent sections of the wall portion of the light director and through said partially opaque wall portions of said translucent member forms cooperation and variation in patterns of light so emanating to outside the device.

16. The integral hologram display device of claim 8, wherein said drive system causes one or more of said lighting director and said translucent member to move relative to one another.

17. An integral hologram display device comprising:
a base;
a drive system housed in said base;
an illumination source supported on said base;
an upper translucent portion mounted for movement on said base;
a partially opaque lower portion mounted for movement on said base; and
hologram information on said translucent portion, and advertising indicia on said lower portion so that said drive system causes the translucent and opaque portions to move with respect to said base whereby a rotating, 3 dimensional integral holographic stereogram is observed through the translucent portion from a fixed position spaced from the device and changing designs are visible on the opaque portion.

18. The integral hologram display device of claim 17, wherein said translucent and opaque portions are of a generally cylindrical shape.

19. The integral hologram lamp display device of claim 17, wherein said translucent and opaque portions are of a frustum shape.

20. The integral hologram display device of claim 17 including a light director about the source of illumination.

21. The integral hologram display device of claim 17 including a light director about the source of illumination, said light director being shaped to direct light emanating from the source of illumination onto the holographic information on the translucent portion.

22. The integral hologram display device of claim 21, wherein the source of illumination provides non-coherent white light and said light director includes an aperture to direct said white light emanating from the source of illumination, onto the holographic information carried by the translucent portion to form a 360-degree viewable, 3 dimensional integral holographic stereogram.

23. The integral hologram display device of claim 17, wherein a first end of said translucent portion is supported on said base, and a cover is secured to a second end of said translucent member.

24. The integral hologram display device of claim 17 including a second translucent portion of holographic recording film of generally cylindrical shape bearing the holographic information secured to the first translucent portion.

25. The integral hologram display device of claim 17, wherein said drive system causes said translucent portion to move in a first direction relative to the base.

26. The integral hologram display device of claim 17, wherein said source of illumination is electrically energized.

27. A motion lamp comprising:

a base;

a drive system housed in said base;

a translucent member of a generally cylindrical shape mounted for rotation on said base, said translucent member having holographic image information thereon, supported about a source of illumination supported on said base, said source of illumination providing non-coherent, white light;

a generally opaque member mounted for rotation on the base having a portion extending upwardly from said base to above said source of illumination and ending at said translucent member, and said opaque member having translucent portions allowing light from said illumination source to emanate through said translucent portions to form designs visible outside said device; and a cover being secured to a top end of said translucent member;

said drive system causing the translucent member and the opaque member to rotate with respect to said base whereby an integral holographic stereogram is observed from outside the lamp.

* * * * *

UNITED STATES PATENT AND TRADEMARK OFFICE
CERTIFICATE OF CORRECTION

PATENT NO. : 6,844,948 B2
APPLICATION NO. : 10/107700
DATED : January 18, 2005
INVENTOR(S) : Larry Lieberman et al.

Page 1 of 1

It is certified that error appears in the above-identified patent and that said Letters Patent is hereby corrected as shown below:

Title Page

Item (75) Inventors should read --Larry Lieberman, Ocala, FL (US); Guillermo Martinez, Cumming, GA (US); Pablo Liberatori, Miami, FL (US)--.

Signed and Sealed this

First Day of July, 2008

JON W. DUDAS
*Director of the United States Patent and Trademark Office*